the tapered sections T2 and T3 of the turbine blades T1, thereby forcing the turbine blades, the turbine disc T and the shaft 33 to rotate in the same direction as the crankshaft 25. As the fluid flows from the cups formed between tapered sections T2 and T3 of turbine blades to the tapered sections T4, its direction is effectively reversed as shown in FIG. 14, thereby effecting a maximum transfer of energy from the fluid to the turbine blades. In addition, in FIG. 15 it can be seen that the ring R2 at R2' constricts the fluid between tapered sections T4 to increase the velocity and pressure of the fluid as it passes into the reactor. As the fluid leaves the turbine blades between tapered sections T4, the fluid is flowing in a direction which is slanted against the direction of rotation. This is best shown in FIG. 14. When the fluid leaves the turbine blades T1, it is directed against the slanted deflector blades C2 and C3; and since these blades are rotating in the same direction as the turbine, they present moving walls against which the fluid from the turbine blades must impinge. A reactive force, indicated by arrows 2, is, therefore, produced against the tapered portions T4 of the turbine blades T1 which assists in rotating the turbine. Thus, a rotational force is imparted to the turbine blades at their leading edges in the torus and also at their trailing edges. After the fluid impinges against the deflector blades C2 and C3, it flows to the inner peripheral ends of the driver blades A1 and thence radially outwardly through the driver blades as indicated by arrows 3 in FIGS. 1, 12 and 13 to the leading edges of the turbine blades where the cycle is repeated. By virtue of the fact that alternate deflector blades C3 are shorter than blades C2, a minimum amount of resistance is presented to the fluid in passing from the entrance impeller to the impeller. It will be noted that the fluid from the entrance impeller is shifted into the impeller by the tilted blades at C2'.

It will be noted that the passageway in the torus between elements A and R1, and between elements T and R2, is relatively narrow in width. This is in contrast to prior art devices of this type wherein the width of the passageway extended for almost the entire cross-sectional radial width of the torus. By virtue of the narrow construction of the present invention, the velocity of vortical flow of fluid within the torus is maximized to increase the efficiency of torque transmission. This is particularly important at the trailing edges of the turbine blades T1. Whereas, in prior art devices the fluid merely passed from the turbine to the reactor blades, the width of the turbine blades at their trailing edges could be relatively wide with a low fluid flow velocity. On the other hand, in the present invention torque is transmitted at the trailing edges of the turbine blades so that it is of utmost importance that the velocity be maximized at this point. This is accomplished, as was explained above, by narrowing the width of the blades at their trailing edges. It will also be noted that the trailing edges of the driver blades A1 are narrower than their leading edges, thereby producing a venturi effect to maximize the velocity of the fluid at the point of torque transmission. Furthermore, the driver, turbine and deflector blades are closely spaced around the torus to minimize any slippage.

If it is assumed that the turbine shown herein is employed on a vehicle, the deflector blades C2 and C3 will effectively push the fluid projected by the turbine blades T1 in the direction of rotation until a speed of about twenty-five miles per hour is reached. When the vehicle exceeds a speed of about twenty-five miles per hour, however, the turbine will out-race the rotary reactor C. Consequently, the circumferential speed of the deflector blades C2 and C3 is now less than that of the turbine blades T1. This means that the relative velocity between the fluid leaving the turbine blades and the deflector blades will be decreasing to decrease the coupling effect produced between the turbine and the rotary reactor. Thus, at higher speeds, torque multiplication is obtained.

The operation of the invention may be summarized as follows:

*First action of torque converter*

The driving power in the device is created by the centrifugal force of the fluid projecting from point A3 of impeller blades A1 into each turbine fluid cup located inbetween the two-way tapered turbine blade at T2 and T3. This first fluid action is indicated or expressed by the arrows 1 in FIGS. 1, 10 and 11.

*Second action of torque converter*

The driving power for the second fluid action is also produced by the impeller. That is, the fluid discharged from the turbine cups in the path of the torus creates a great pressure inbetween the turbine blades T1. This fluid, under great pressure, passes through the relatively narrow portion formed between turbine disc T and the ring R2 at R2' and into the deflector blades C2 and C3. Assuming that the deflector and impeller are rotating at a greater speed than the turbine, as when a vehicle initially accelerates, the fluid projected from the turbine outlet between R2' and T will be pushed or compressed by the deflector blades C2 and C3 in the direction of rotation, thereby creating the second action of the converter as indicated by arrows 2 in FIGS. 1 and 14.

Thereafter, the fluid through the deflector blades C2 and C3 is shifted into the impeller blades by centrifugal force produced by the tilted deflector blades at C2' as indicated by arrows 3 in FIGS. 1, 12 and 13.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A fluid coupling having a normal direction of rotation comprising a driving shaft and a coaxial driven shaft; an impeller, a turbine, and an entrance impeller defining a torus ring and providing complementary portions of a torus section; said impeller and entrance impeller being carried by said driving shaft and said turbine being carried by said driven shaft; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said entrance impeller comprising an annular entrance impeller shell carrying a plurality of deflector blades each having an edge attached to said entrance impeller shell, an inlet edge closely adjacent to said outlet edges of said driven blades, and an outlet edge closely adjacent to said inlet edges of said driving blades; each said deflector blade being tilted away from said normal direction of rotation adjacent to its inlet edge about an axis which is crosswise of a radial flow area of the vortical flow of the fluid whereby fluid from said driven blades impinges upon flat sides of said deflector blades and causes a reactive force to be transferred through the fluid back to said driven blades and exerts a driving force at the inner periphery of said turbine in said normal direction of rotation.

2. A fluid coupling having a normal direction of rotation comprising a driving shaft and a coaxial driven shaft; an impeller, a turbine, and an entrance impeller defining a torus ring and providing complementary portions of a torus section; said impeller and entrance impeller being carried by said driving shaft and said turbine being carried by said driven shaft; said impeller comprising an annular impeller shell carrying a plurality of driving

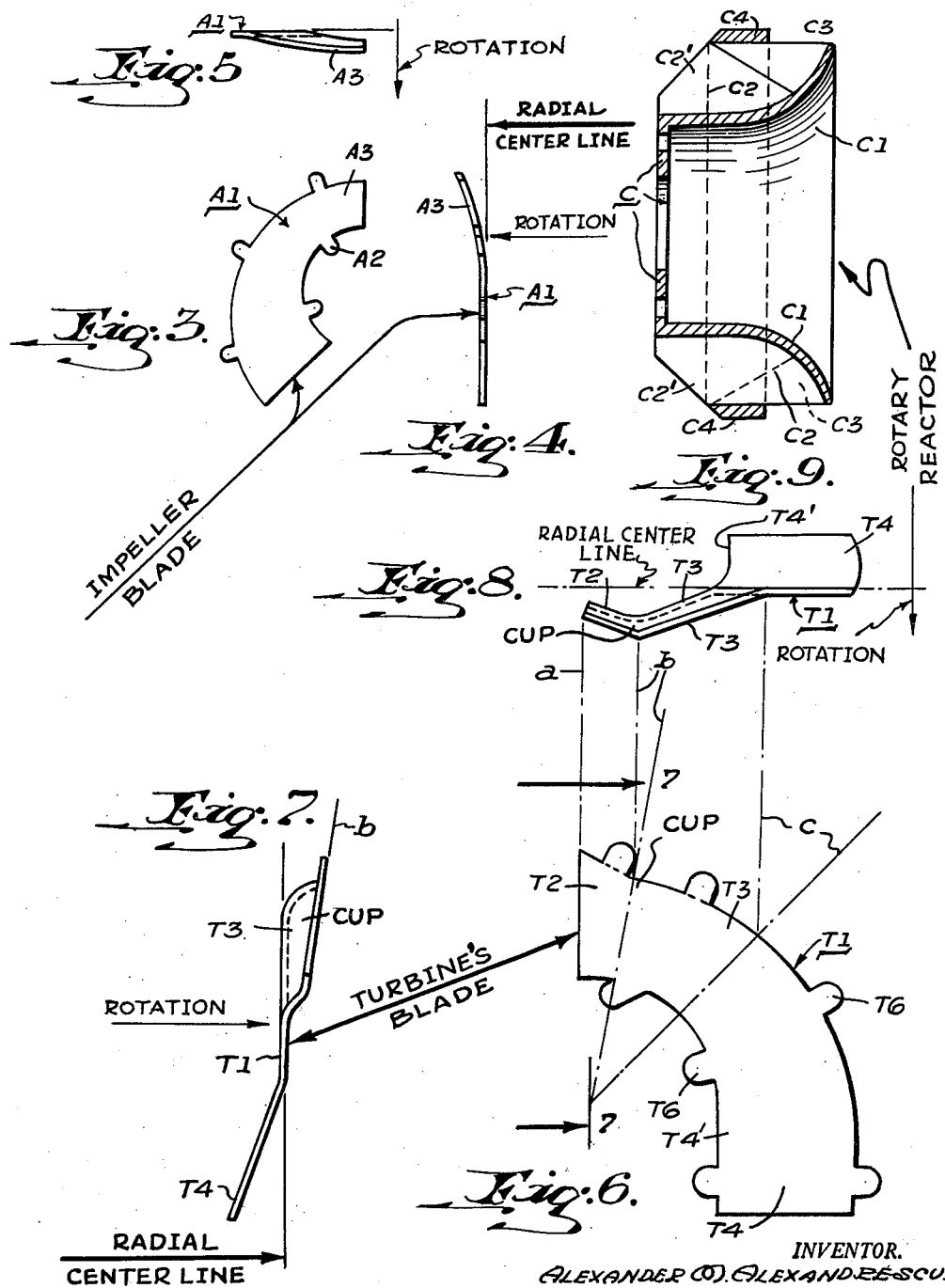

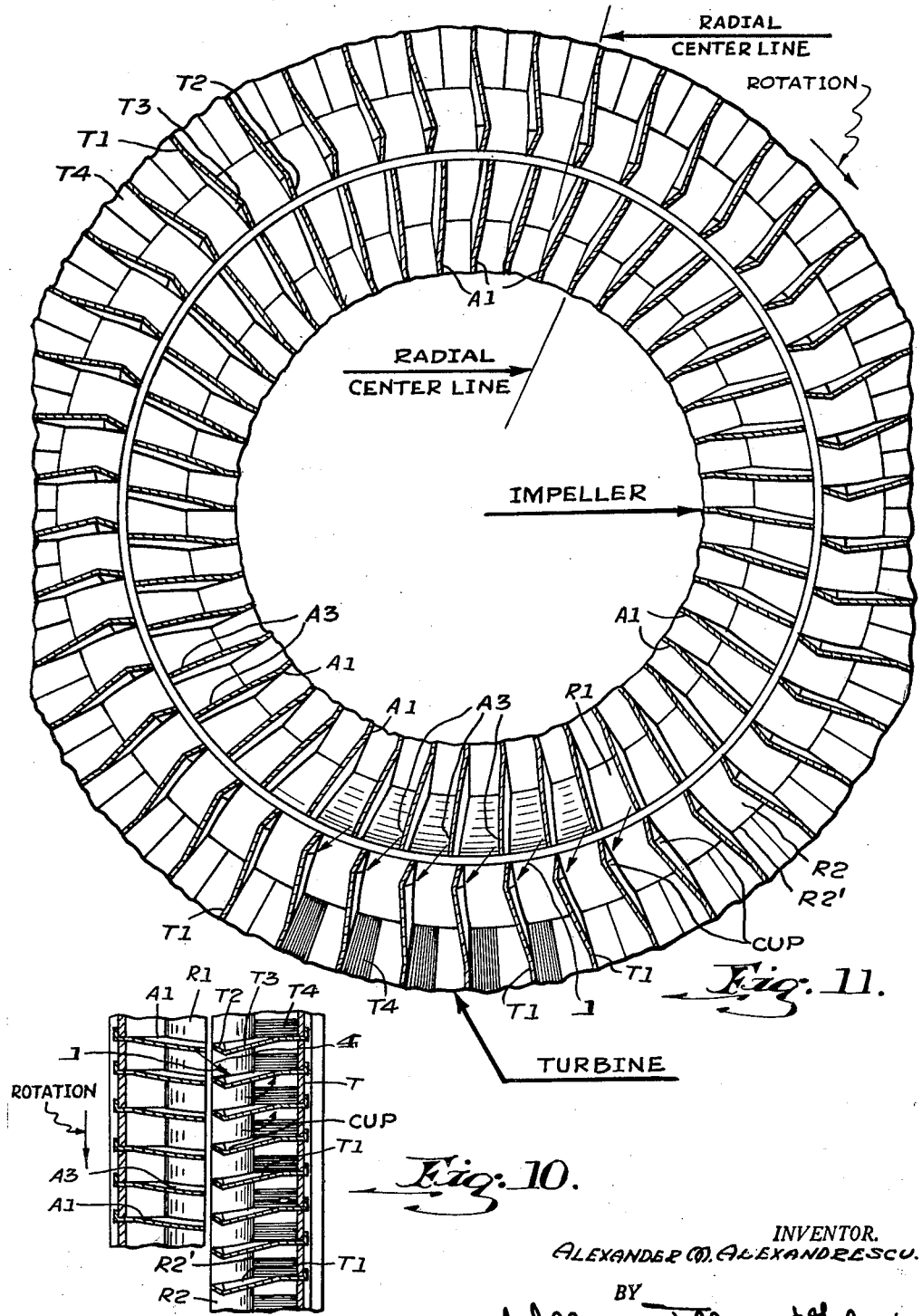

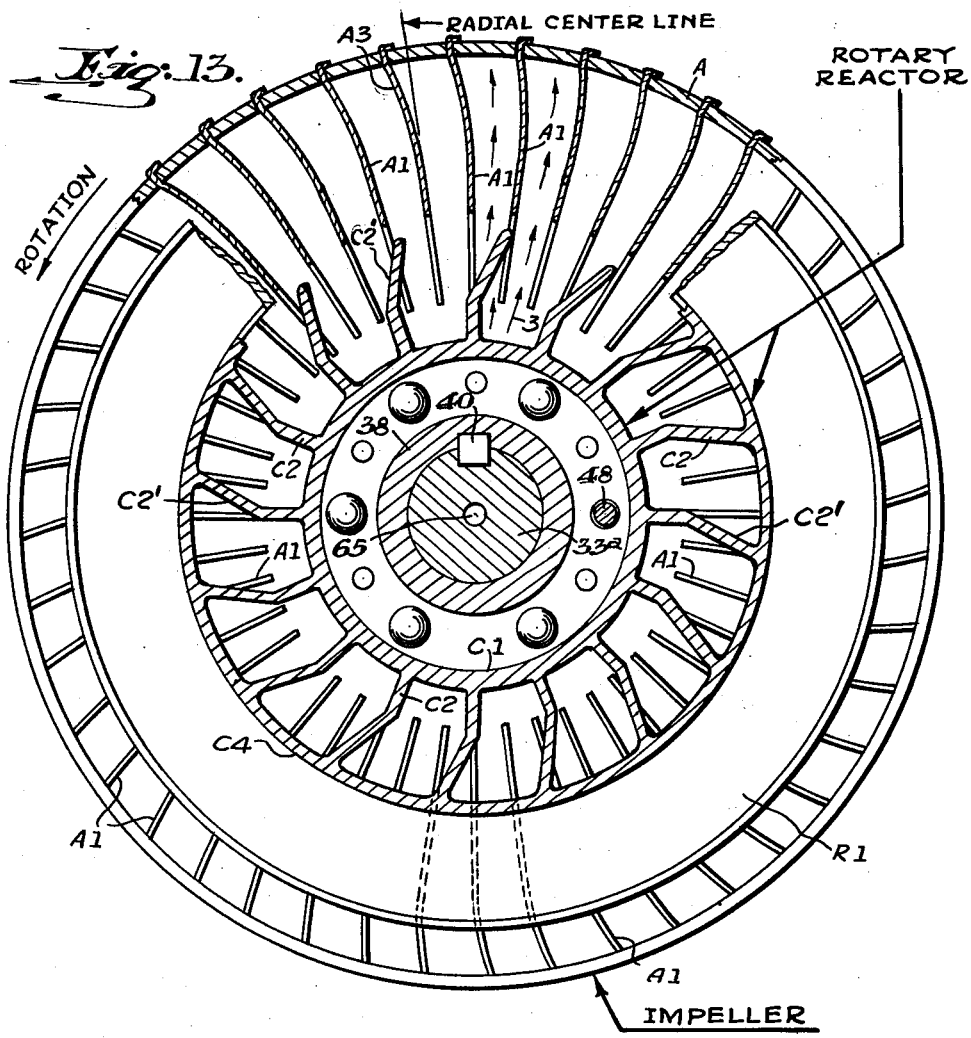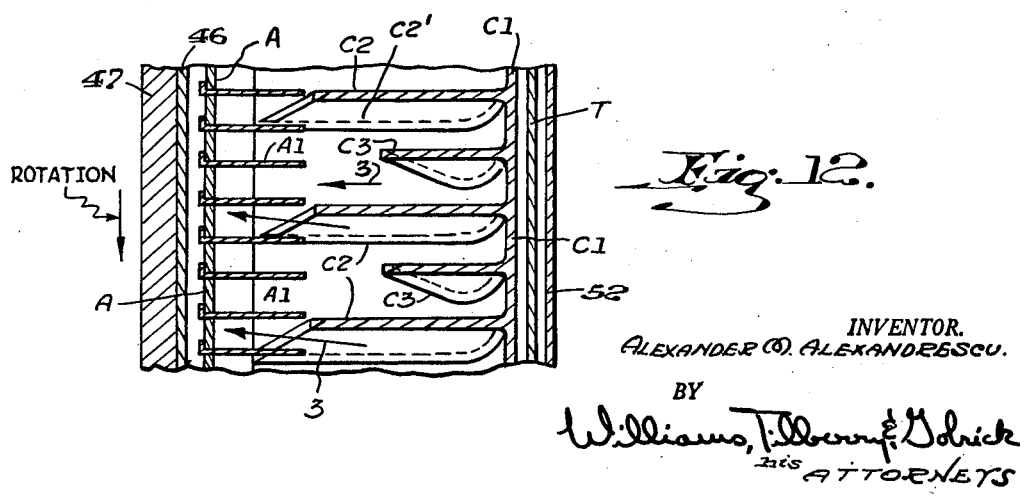

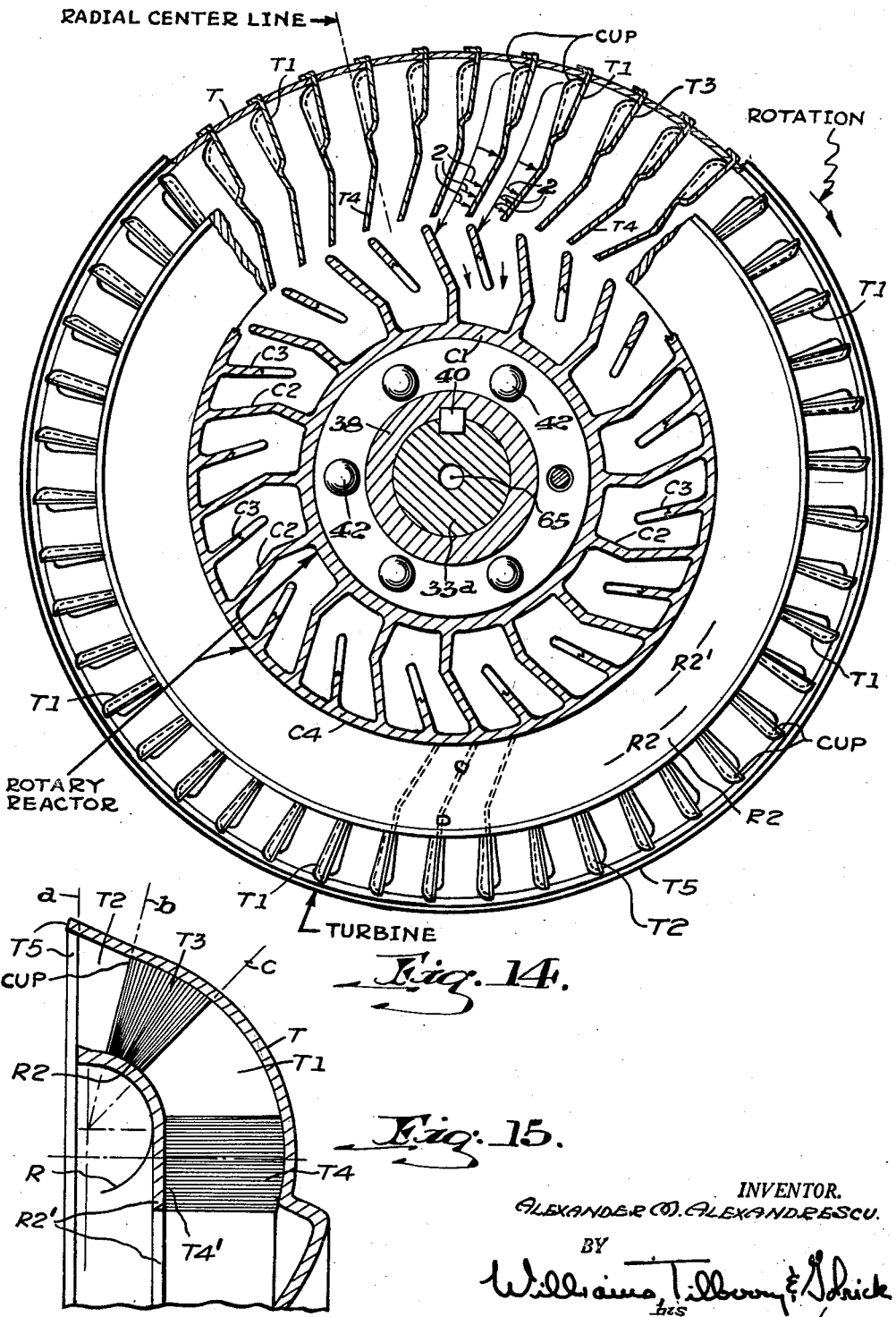

United States Patent Office 3,167,917
Patented Feb. 2, 1965

3,167,917
HYDRAULIC COUPLING
Alexander M. Alexandrescu, 549 E. 114th St.,
Cleveland, Ohio
Filed Sept. 7, 1960, Ser. No. 54,438
9 Claims. (Cl. 60—54)

This invention relates to a new type double-action fluid coupling for automotive vehicles and the like, and more particularly to a double-acting fluid coupling of the type employing a pair of relatively rotatable elements, the driving element being an impeller which acts upon hydraulic fluid in the coupling to cause rotation of a driven turbine element.

This application is a continuation-in-part of U.S. Patent No. 2,952,976, dated September 20, 1960.

As will hereinafter become apparent, the fluid coupling of the present invention is of the type in which impeller and turbine wheels, each having a plurality of blades thereon, are arranged in a torus configuration about concentric axles, the arrangement being such that torque is transmitted from the impeller to the turbine by means of a combined rotational fluid flow circumferentially around the axis of the torus and a vortex flow within the torus itself. In previous arrangements of this type, torque was transmitted from the impeller to the turbine by the action of the fluid in passing from the trailing edges of the impeller blades to the leading edges of the turbine blades in its vortical path around the torus, while the fluid merely passed from the turbine blades back to the impeller blades without any torque transmission. Thus, in such previous arrangements, torque was transmitted at only one point around the fluid coupling, namely, the juncture of the trailing edges of the impeller blades and the leading edges of the turbine blades.

As a primary object, the present invention provides a fluid coupling of the general type described above in which torque is transmitted from the driving to the driven shaft at a plurality of points around the torus configuration, thereby greatly increasing the efficiency of the device.

Another object of the invention is to provide a fluid coupling having an impeller and a turbine capable of achieving torque multiplication independently of any associated gearing or similar apparatus.

A further object of the invention is to provide a fluid coupling of the general type described in which the impeller and turbine blades are shaped to achieve maximum efficiency of torque transmission at all speeds.

Still another object of the invention is to provide a fluid coupling which will transmit torque smoothly in all types of automotive vehicles, large or small, in trucks, buses and vehicles employing large diesel engines.

In accordance with the invention, the fluid coupling includes an impeller wheel and a turbine wheel arranged in a torus configuration, the arrangement being such that the fluid will flow in a vortical path from the trailing edges of the impeller to the leading edges of the turbine blades as in previous couplings of this type. However, in contrast to previous devices, the impeller wheel of the present invention carries a plurality of deflector blades interposed in the torus between the turbine and impeller blades whereby the fluid will flow from the turbine blades to the deflector blades rather than directly to the impeller blades. As will be seen, these deflector blades are so shaped that as the fluid in its vortical path around the torus leaves the trailing edges of the turbine blades and strikes the deflector blades, torque is transmitted from the impeller wheel, which carries the deflector blades, to the turbine wheel. Thus, torque is transmitted not only at the leading edges of the turbine blades as in prior art devices, but also at their trailing edges. The turbine and deflector blades are so shaped that at low speeds, when the impeller overruns the turbine and high torque is required, the combined action at the leading and trailing edges of the turbine blades will give this high torque. When, however, the speed of the turbine exceeds that of the impeller, as at about thirty miles per hour in a vehicle, torque multiplication will be achieved.

The above and other objects and features of the invention will become apparent from the following detailed description taken in connection with the accompanying drawings which form a part of this specification and, in which:

FIGURE 1 is a longitudinal cross-sectional view of the double-acting fluid coupling of the invention;

FIG. 2 is a cross-sectional view taken along line 2—2 of FIG. 1;

FIGS. 3, 4 and 5 are side, end and top views, respectively, of the impeller blades employed in the fluid coupling of FIG. 1;

FIGS. 6, 7 and 8 are side, end and top views, respectively, of the turbine blades employed in the fluid coupling of FIG. 1;

FIG. 9 is a cross-sectional view of the entrance impeller element of the fluid coupling of FIG. 1;

FIG. 10 is a cross-sectional view taken along line 10—10 of FIG. 1 illustrating the path of the fluid in flowing from the impeller to the turbine blades as viewed from the top;

FIG. 11 is a cross-sectional view taken by circumscribing the line 10—10 of FIG. 1 around the axis of the fluid coupling, illustrating the path of fluid in flowing from the impeller blades to the turbine blades;

FIG. 12 is a cross-sectional view taken along line 12—12 of FIG. 1 illustrating the path of fluid in flowing from the deflector blades to the impeller blades as viewed from the top;

FIG. 13 is a cross-sectional view taken along line 13—13 of FIG. 1 illustrating the path of fluid in flowing from the deflector blades to the impeller blades as viewed from the side;

FIG. 14 is a cross-sectional view taken along line 14—14 of FIG. 1 illustrating the path of fluid in flowing from the turbine blades to the deflector blades as viewed from the side; and FIG. 15 is an enlarged fragmentary section of the turbine, taken along its radius.

Referring now to the drawings, and in particular to FIG. 1, the numeral 23 designates an engine block having a rear main bearing 24 therein which carries a rotatable crankshaft 25. Secured to the engine block by means of bolts or other suitable fastening means is a transmission housing 26 having a lower pan 27 secured thereto. One section of the pan 27 is provided with a removable plate 28 which permits access to a transmission fluid pump P, hereinafter described. Integral with the transmission housing 26 is a forward transmission bearing 29, while below the forward transmission bearing 29 is the pump P.

The right end of crankshaft 25, generally indicated at 30 in the drawing, is bored as at 32. Bore 32 is fitted with a sleeve bearing 31 which carries, for rotation, the reduced diameter forward end of a turbine shaft 33. In this manner it will be readily appreciated that the crankshaft 25 and turbine shaft 33 may rotate independently of each other. The rear or right end of the turbine shaft 33c is carried within the forward transmission bearing 29, substantially as shown. Integral with section 33c of the turbine shaft 33 is a power transmission gear 33d which has a generally annular cavity provided therein for the reception of a direct drive power transmission clutch casing 34. The casing 34, as well as section 33c of the turbine shaft 33, are provided with a bore 37 having a bushing bearing 35 provided therein. As shown, the bearing 35 carries the forward end of a power transmission shaft 36. Since the power transmission per se forms no part of the present invention, it is not shown herein in detail.

Mounted on the turbine shaft 33, at section 33a, is a hub 38 keyed to the shaft 33 by means of key 40 and held in its axial position on the shaft by means of ring nut 39. Integral with hub 38 is a flange 41 which carries an annular turbine disc T, the turbine disc being secured between the flange 41 and an annular washer 43 by means of rivets 42. The rearward end 30 of crankshaft 25 is splined, as best shown in FIG. 2, and receives a cooperatively splined annular flange 45. Abutting the left face of the flange 45, as shown in FIG. 1, is an annular fluid enclosure disc 46 and a flywheel 47. Abutting the opposite or right surface of the flange 45 are an annular impeller disc A and a flange B of an entrance impeller element C, with each of the abutting elements being secured to the flange 45 by a plurality of circumferentially spaced rivets 48.

Surrounding section 33b of turbine shaft 33 is an annular bushing bearing 50 which supports an independently rotatable supporting sleeve 49. The forward end of sleeve 49 is provided with an annular flange 51 which carries an annular rear fluid enclosure 52, this enclosure being secured between the flange 51 and an annular washer 53 by means of rivets 54. The outer peripheral edges of the forward and rear fluid enclosures 46 and 52, respectively, are connected in abutting relationship by means of studs and nuts 55, the studs being spot-welded to the disc 52 as indicated at 56.

On the rear or right end of sleeve 49 is a ring gear 57 which meshes with a large pump gear 58, the arrangement being such that as the crankshaft 25 and enclosures 46 and 52 rotate, the gear 58 will also rotate to drive the gear pump P. Thus, as long as the engine within engine block 23 is running, the crankshaft 25 will rotate to drive the gear pump P. The pump P will force oil from a main sump S to a groove 59 in the pump housing which, in turn, communicates with a radial passageway 60 in the forward transmission bearing 29. From passageway 60, fluid under pressure enters bore 37 which communicates with a bore 62 leading to the automatic power transmission, not shown. The bore 37 also communicates, as shown, with a bore 65 in the turbine shaft 33 through a small bore 64 provided in a plug 63 at the forward end or left end of the bore 37. Thus, a restricted amount of fluid is permitted to pass from the pump to the bore 65 which leads to the bore 32 provided in right or rear end 30 of the crankshaft 25. From bore 32, the fluid passes through channels or passageways 66 provided in the bushing bearing 31. These channels are best shown in FIG. 2, and it will be noted in FIG. 1 that they communicate with the area indicated at 67 surrounded by the inner periphery of the entrance impeller C. From this area, the fluid flows through passageways 68 (FIG. 2) and into the space 69 which is between the impeller disc A and the front enclosure disc 46. From the space 69, the fluid may pass through space 70 between the turbine disc T and the rear fluid enclosure disc 52 to radially extending grooves 71 in the annular washer 53. Grooves 71 connect the space 70 to a relatively large circumferential opening 72 which is connected, through grooves 73 in the annual bushing 50, to point 61 where the fluid may flow back into the main sump S. Thus, the pump P will continuously circulate fluid through the apparatus to cool the same while insuring that the enclosure defined by the front and back enclosure discs 46 and 52 is filled with fluid at all times.

Carried between the impeller disc A and an annular cup-shaped ring R1 are a plurality of circumferentially spaced driver blades A1, possibly best shown in FIGS. 10, 11 and 13. The details of each driver blade are shown in FIGS. 3, 4 and 5 where the direction of rotation of the driver blades around the crankshaft 25 is indicated by the arrows. As shown, each driver blade A1 may be provided with tabs A2 at spaced points on its periphery. These tabs may be inserted into cooperating slots in impeller disc A and ring R1 and thereafter bent over to hold each driver blade in position. Alternatively, the driver blades may be welded to the elements A and R1 or otherwise securely fastened thereto. It will be noted that the radially outer end A3 of each impeller blade is bent forwardly in the direction of rotation to provide a cup or spoon effect.

In a similar manner, a plurality of circumferentially spaced turbine blades T1 are connected between the turbine disc T and a second cup-shaped annular ring R2. The details of each turbine blade T1 are shown in FIGS. 6, 7, 8 and 15 where the direction of rotation of the turbine blades about the shaft 33 is indicated by the arrows. Tabs T6 may be provided, as in the driver blades A1, to secure the turbine blades to elements T and R2. The turbine blades are formed at their radially outer ends with a two-way taper. T2 represents the first taper, while T3 represents the second taper. It will be noted in FIG. 8 that both of these tapers are formed in front of the radial center line of the apparatus in the direction of rotation. Taper T2 extends from line a to line b, while taper T3 extends from line b to line c. In this manner, a cup is formed in each turbine blade T1 between the tapers T2 and T3 to receive the fluid flowing from the driver blades A1 as will hereinafter be explained. The radially inner portion of each turbine blade T1 is tapered as at T4 on the side of the radial center line of the apparatus opposite the tapers T2 and T3 whereby the taper T4 is slanted away from the direction of rotation of the turbine blades. It will be noted that the tips of the turbine blades T1, in the area of taper T4, are relatively narrow at T4'. In this manner, the velocity of the fluid flowing between the turbine blades is maximized for a purpose which will hereinafter be explained. With reference to FIG. 1, it will be noted that the turbine disc T, at T5, is bent radially outwardly to permit fluid from pump P to flow into the torus during operation of the fluid coupling through opening T7.

The details of the entrance impeller element C are shown in FIG. 9. It comprises an annular element having a cup-shaped portion at C1. Circumferentially spaced around the reactor C are a first plurality of deflector blades C2 which extend substantially along the axial length of the entrance impeller element and are tilted as shown in FIGS. 12 and 14 away from the direction of rotation of the turbine. Between each pair of deflector blades C2 is a smaller deflector blade C3 which is generally triangular in configuration and shorter than the blades C2 to provide an open space between the blades C2 at their inner radial portions. As shown in FIGS. 12 and 14, the deflector blades C3 are also tilted away from the direction of rotation of the turbine. A ring C4 surrounds the outer peripheries of the blades C2 and C3, substantially as shown. The large blades C2 at C2' act to shift fluid from the entrance impeller into the impeller blades.

In operation, the entire space defined within the forward and rear enclosure plates 46 and 52 will be filled with fluid. As the crankshaft 25 rotates, the impeller disc A and the reactor element C will rotate with it, thereby causing a rotational flow of fluid around the axis of the crankshaft. At the same time, a vortical flow of fluid will be induced in the torus defined by the passageway formed between elements A and R1, elements T and R2, and elements C1 and C4. The direction of rotation of the vortical flow within the torus is indicated in FIG. 1 by the arrows 1, 2 and 3. As the crankshaft rotates, the driver blades A1 will force fluid into the spaces between the turbine blades T1 along the path indicated by the arrows 1 in FIGS. 10 and 11. It can be seen that the cup-shaped portions A3 of the driver blades A1 effectively push the fluid into the cups formed between the tapered sections T2 and T3 of the turbine blades T1, thereby forcing the turbine blades, the turbine disc T and the shaft 33 to rotate in the same direction as the crankshaft 25. As the fluid flows from the cups formed between tapered sections T2 and T3 of turbine blades to the tapered sections T4, its direction is effectively reversed as shown in FIG. 14, thereby effecting a maximum transfer of energy from the fluid to the turbine blades. In addition, in FIG. 15 it can be seen that the ring R2 at R2' constricts the fluid between tapered sections T4 to increase the velocity and pressure of the fluid as it passes into the reactor. As the fluid leaves the turbine blades between tapered sections T4, the fluid is flowing in a direction which is slanted against the direction of rotation. This is best shown in FIG. 14. When the fluid leaves the turbine blades T1, it is directed against the slanted deflector blades C2 and C3; and since these blades are rotating in the same direction as the turbine, they present moving walls against which the fluid from the turbine blades must impinge. A reactive force, indicated by arrows 2, is, therefore, produced against the tapered portions T4 of the turbine blades T1 which assists in rotating the turbine. Thus, a rotational force is imparted to the turbine blades at their leading edges in the torus and also at their trailing edges. After the fluid impinges against the deflector blades C2 and C3, it flows to the inner peripheral ends of the driver blades A1 and thence radially outwardly through the driver blades as indicated by arrows 3 in FIGS. 1, 12 and 13 to the leading edges of the turbine blades where the cycle is repeated. By virtue of the fact that alternate deflector blades C3 are shorter than blades C2, a minimum amount of resistance is presented to the fluid in passing from the entrance impeller to the impeller. It will be noted that the fluid from the entrance impeller is shifted into the impeller by the tilted blades at C2'.

It will be noted that the passageway in the torus between elements A and R1, and between elements T and R2, is relatively narrow in width. This is in contrast to prior art devices of this type wherein the width of the passageway extended for almost the entire cross-sectional radial width of the torus. By virtue of the narrow construction of the present invention, the velocity of vortical flow of fluid within the torus is maximized to increase the efficiency of torque transmission. This is particularly important at the trailing edges of the turbine blades T1. Whereas, in prior art devices the fluid merely passed from the turbine to the reactor blades, the width of the turbine blades at their trailing edges could be relatively wide with a low fluid flow velocity. On the other hand, in the present invention torque is transmitted at the trailing edges of the turbine blades so that it is of utmost importance that the velocity be maximized at this point. This is accomplished, as was explained above, by narrowing the width of the blades at their trailing edges. It will also be noted that the trailing edges of the driver blades A1 are narrower than their leading edges, thereby producing a venturi effect to maximize the velocity of the fluid at the point of torque transmission. Furthermore, the driver, turbine and deflector blades are closely spaced around the torus to minimize any slippage.

If it is assumed that the turbine shown herein is employed on a vehicle, the deflector blades C2 and C3 will effectively push the fluid projected by the turbine blades T1 in the direction of rotation until a speed of about twenty-five miles per hour is reached. When the vehicle exceeds a speed of about twenty-five miles per hour, however, the turbine will out-race the rotary reactor C. Consequently, the circumferential speed of the deflector blades C2 and C3 is now less than that of the turbine blades T1. This means that the relative velocity between the fluid leaving the turbine blades and the deflector blades will be decreasing to decrease the coupling effect produced between the turbine and the rotary reactor. Thus, at higher speeds, torque multiplication is obtained.

The operation of the invention may be summarized as follows:

*First action of torque converter*

The driving power in the device is created by the centrifugal force of the fluid projecting from point A3 of impeller blades A1 into each turbine fluid cup located inbetween the two-way tapered turbine blade at T2 and T3. This first fluid action is indicated or expressed by the arrows 1 in FIGS. 1, 10 and 11.

*Second action of torque converter*

The driving power for the second fluid action is also produced by the impeller. That is, the fluid discharged from the turbine cups in the path of the torus creates a great pressure inbetween the turbine blades T1. This fluid, under great pressure, passes through the relatively narrow portion formed between turbine disc T and the ring R2 at R2' and into the deflector blades C2 and C3. Assuming that the deflector and impeller are rotating at a greater speed than the turbine, as when a vehicle initially accelerates, the fluid projected from the turbine outlet between R2' and T will be pushed or compressed by the deflector blades C2 and C3 in the direction of rotation, thereby creating the second action of the converter as indicated by arrows 2 in FIGS. 1 and 14.

Thereafter, the fluid through the deflector blades C2 and C3 is shifted into the impeller blades by centrifugal force produced by the tilted deflector blades at C2' as indicated by arrows 3 in FIGS. 1, 12 and 13.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A fluid coupling having a normal direction of rotation comprising a driving shaft and a coaxial driven shaft; an impeller, a turbine, and an entrance impeller defining a torus ring and providing complementary portions of a torus section; said impeller and entrance impeller being carried by said driving shaft and said turbine being carried by said driven shaft; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said entrance impeller comprising an annular entrance impeller shell carrying a plurality of deflector blades each having an edge attached to said entrance impeller shell, an inlet edge closely adjacent to said outlet edges of said driven blades, and an outlet edge closely adjacent to said inlet edges of said driving blades; each said deflector blade being tilted away from said normal direction of rotation adjacent to its inlet edge about an axis which is crosswise of a radial flow area of the vortical flow of the fluid whereby fluid from said driven blades impinges upon flat sides of said deflector blades and causes a reactive force to be transferred through the fluid back to said driven blades and exerts a driving force at the inner periphery of said turbine in said normal direction of rotation.

2. A fluid coupling having a normal direction of rotation comprising a driving shaft and a coaxial driven shaft; an impeller, a turbine, and an entrance impeller defining a torus ring and providing complementary portions of a torus section; said impeller and entrance impeller being carried by said driving shaft and said turbine being carried by said driven shaft; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said entrance impeller comprising an annular entrance impeller shell carrying a plurality of deflector blades each having an edge attached to said entrance impeller shell, an inlet edge closely adjacent to said outlet edges of said driven blades, and an outlet edge closely adjacent to said inlet edges of said driving blades; each said deflector blade having at least a portion thereof adjacent to its inlet edge tilted away from said normal direction of rotation about an axis which is crosswise of a radial flow area of the vortical flow of the fluid and each said driven blade being tilted away from said normal direction of rotation adjacent to its outlet edge about an axis which is crosswise of a radial flow area of the vortical flow of fluid whereby fluid from said driven blades impinges upon flat sides of said deflector blades and causes a reactive force to be transferred through the fluid back to said driven blades and exerts a driving force at the inner periphery of said turbine in said normal direction of rotation.

3. A fluid coupling having a normal direction of rotation comprising a driving shaft and a coaxial driven shaft; an impeller, a turbine, and an entrance impeller defining a torus ring and providing complementary portions of a substantially circular torus section; said impeller and entrance impeller being carried by said driving shaft and said turbine being carried by said driven shaft; said impeller comprising an annular impeller shell carrying a plurality of driving blades each having an edge attached to said impeller shell, an outlet edge adjacent to the outer periphery of said ring, and an inlet edge adjacent to the inner periphery of said ring; said turbine comprising an annular turbine shell carrying a plurality of driven blades each having an edge attached to said turbine shell, an inlet edge adjacent to the outer periphery of said ring, and an outlet edge adjacent to the inner periphery of said ring; said entrance impeller comprising an annular entrance impeller shell carrying a plurality of deflector blades each having an edge attached to said entrance impeller shell, an inlet edge closely adjacent to said outlet edges of said driven blades; at least some of said deflector blades having outlet edges closely adjacent to said inlet edges of said driving blades and other of said deflector blades having outlet edges spaced away from said inlet edges of said driving blades; said driven blades being disposed more closely together at their outlet edges than at their inlet edges to increase the velocity of the fluid passing from said turbine to said entrance impeller; each said deflector blade having at least a portion thereof adjacent to its inlet edge tilted away from said normal direction of rotation about an axis which is crosswise of a radial flow area of the vortical flow of the fluid and each said driven blade being tilted away from said normal direction of rotation adjacent to its outlet edge about an axis which is crosswise of a radial flow area of the vortical flow of fluid whereby fluid from said driven blades impinges upon flat sides of said deflector blades and causes a reactive force to be transferred through the fluid back to said driven blades and exerts a driving force at the inner periphery of said turbine in said normal direction of rotation.

4. A fluid coupling having a normal direction of rotation comprising a driving shaft and a coaxial driven shaft; an impeller, a turbine, and an entrance impeller defining a torus ring and providing complementary portions of a substantially circular torus section; said impeller and entrance impeller being carried by said driving shaft and said turbine being carried by said driven shaft; said impeller comprising outer and inner annular impeller shells carrying a plurality of driving blades each having an outer edge attached to said outer impeller shell, an inner edge attached to said inner impeller shell, an outlet edge adjacent to the outer periphery of said ring, and an inlet edge adjacent to the inner periphery of said ring; said turbine comprising outer and inner annular turbine shells carrying a plurality of driven blades each having an outer edge attached to said outer turbine shell, an inner edge attached to said inner turbine shell, an inlet edge adjacent to the outer periphery of said ring, and an outlet edge adjacent to the inner periphery of said ring; said entrance impeller comprising outer and inner annular entrance impeller shells carrying a plurality of deflector blades each having an outer edge attached to said outer entrance impeller shell, an inner edge portion attached to said inner entrance impeller shell, an inlet edge portion closely adjacent to said outlet edges of said driven blades, and an outlet edge closely adjacent to said inlet edges of said driving blades; said driven blades being disposed more closely together at their outlet edges than at their inlet edges to increase the velocity of the fluid passing from said turbine to said entrance impeller; each said deflector blade having at least a portion thereof adjacent to its inlet edge tilted away from said normal direction of rotation about an axis which is crosswise of a radial flow area of the vortical flow of the fluid whereby fluid from said driven blades impinges upon flat sides of said deflector blades and causes a reactive force to be transferred through the fluid back to said driven blades and exerts a driving force at the inner periphery of said turbine in said normal direction of rotation.

5. A fluid coupling having a normal direction of rotation comprising a driving shaft and a coaxial driven shaft; an impeller, a turbine, and an entrance impeller defining a torus ring and providing complementary portions of a substantially circular torus section; said impeller and entrance impeller being carried by said driving shaft and said turbine being carried by said driven shaft; said impeller comprising outer and inner annular impeller shells carrying a plurality of driving blades each having an outer edge attached to said outer impeller shell, an inner edge attached to said inner impeller shell, an outlet edge adjacent to the outer periphery of said ring, and an inlet edge adjacent to the inner periphery of said ring; said turbine comprising outer and inner annular turbine shells carrying a plurality of driven blades each having an outer edge attached to said outer turbine shell, an inner edge attached to said inner turbine shell, an inlet edge adjacent to the outer periphery of said ring, and an outlet edge adjacent to the inner periphery of said ring; said entrance impeller comprising outer and inner annular entrance impeller shells carrying a plurality of deflector blades each having an outer edge attached to said outer entrance impeller shell, an inner edge portion attached to said inner entrance impeller shell, an inlet edge portion closely adjacent to said outlet edges of said driven blades; at least some of said deflector blades having outlet edges closely adjacent to said inlet edges of said driving blades and other of said deflector blades having outlet edges spaced away from said inlet edges of said driving blades; each said deflector blade having at least a portion thereof adjacent to its inlet edge tilted away from said normal direction of rotation about an axis which is crosswise of a radial flow area of the vortical flow of the fluid and each said driven blade being tilted away from said normal direction of rotation adjacent to its outlet edge about an axis which is crosswise of a radial flow area of the vortical flow of fluid whereby fluid from said driven blades impinges upon flat sides of said deflector blades and causes a reactive force to be transferred through the fluid back to said driven blades and exerts a driving force at the inner periphery of said turbine in said normal direction of rotation.

6. A fluid coupling having a normal direction of rotation comprising a driving shaft and a coaxial driven shaft; an impeller, a turbine, and an entrance impeller defining a torus ring and providing complementary portions of a substantially circular torus section; said impeller and entrance impeller being carried by said driving shaft and said turbine being carried by said driven shaft; said impeller comprising outer and inner annular impeller shells carrying a plurality of driving blades each having an outer edge attached to said outer impeller shell, an inner edge attached to said inner impeller shell, an outlet edge adjacent to the outer periphery of said ring, and an inlet edge adjacent to the inner periphery of said ring; said turbine comprising outer and inner annular turbine shells carrying a plurality of driven blades each having an outer edge attached to said outer turbine shell, an inner edge attached to said inner turbine shell, an inlet edge adjacent to the outer periphery of said ring, and an outlet edge adjacent to the inner periphery of said ring; said entrance impeller comprising outer and inner annular entrance impeller shells carrying a plurality of deflector blades each having an outer edge attached to said outer entrance impeller shell, an inner edge portion attached to said inner entrance impeller shell, an inlet edge portion closely adjacent to said outlet edges of said driven blades; at least some of said deflector blades having outlet edges closely adjacent to said inlet edges of said driving blades and other of said deflector blades having outlet edges spaced away from said inlet edges of said driving blades; said inner and outer impeller shells being shaped to provide a vortical passage which progressively decreases in size from the inner to the outer peripheries of said impeller to increase the velocity of fluid passing from said impeller into said turbine; said driven blades being disposed more closely together at their outlet edges than at their inlet edges to increase the velocity of the fluid passing from said turbine to said entrance impeller; each said deflector blade having at least a portion thereof adjacent to its inlet edge tilted away from said normal direction of rotation about an axis which is crosswise of a radial flow area of the vortical flow of the fluid and each said driven blade being tilted away from said normal direction of rotation adjacent to its outlet edge about an axis which is crosswise of a radial flow area of the vortical flow of fluid whereby fluid from said driven blades impinges upon flat sides of said deflector blades and causes a reactive force to be transferred through the fluid back to said driven blades and exerts a driving force at the inner periphery of said turbine in said normal direction of rotation.

7. A fluid coupling having a normal direction of rotation comprising a driving shaft and a coaxial driven shaft; an impeller, a turbine, and an entrance impeller defining a torus ring and providing complementary portions of a torus section; said impeller and said entrance impeller being carried by said driving shaft and said turbine being carried by said driven shaft; said impeller carrying driving blades having inlet and outlet portions, said turbine carrying driven blades having inlet and outlet portions, and said entrance impeller carrying deflector blades having inlet and outlet portions; said entrance impeller and said deflector blades being disposed at the inner axial flow cross-over area at the inner periphery of said torus ring; certain of said deflector blades having their inlet portions disposed adjacent to the outlet portions of said driven blades and receiving the inward radial flow of fluid from said driven blades; said certain deflector blades having their outlet portions disposed adjacent to the inlet portions of said driving blades and delivering the outward radial flow of fluid to the impeller blades; said certain deflector blades extending from the turbine outlet to the impeller inlet across said axial flow cross-over area and being generally radially disposed with respect to the axis of said fluid coupling; said certain deflector blades having flat surface portions which are tilted backwardly with respect to said normal direction of rotation; said flat surface portions being disposed at the outer radial portions of said certain deflector blades adjacent to said driving and driven blades whereby the inward radial flow of fluid from said driven blades impinges upon said flat surface portions and causes a reactive force to be transferred through the fluid back to the outlet portions of said driven blades.

8. A fluid coupling at set forth in claim 7; other of said deflector blades having their outlet portions spaced a substantial distance away from the inlet portions of said driving blades and their inlet portions disposed adjacent to the outlet portions of said driven blades; said other deflector blades having flat surface portions which are tilted backwardly with respect to said normal direction of rotation in like manner as said first mentioned flat surface portions.

9. A fluid coupling as set forth in claim 8; said certain deflector blades being alternately positioned relative to said other deflector blades around the circumference of said entrance impeller.

References Cited in the file of this patent
UNITED STATES PATENTS

| | | |
|---|---|---|
| 1,937,364 | Sinclair | Nov. 28, 1933 |
| 2,200,596 | Dodge | May 14, 1940 |
| 2,381,187 | Swift | Aug. 7, 1945 |
| 2,388,329 | Jandasek | Nov. 6, 1945 |
| 2,393,859 | Jandasek | Jan. 29, 1946 |
| 2,673,450 | Wolf | Mar. 30, 1954 |
| 2,720,952 | Alexandrescu | Oct. 18, 1955 |
| 2,890,661 | Egbert | June 16, 1959 |
| 2,952,976 | Alexandrescu | Sept. 20, 1960 |